May 22, 1928.
A. MONACO
1,670,688
CUTTING MACHINE
Filed Dec. 14, 1925
2 Sheets-Sheet 1
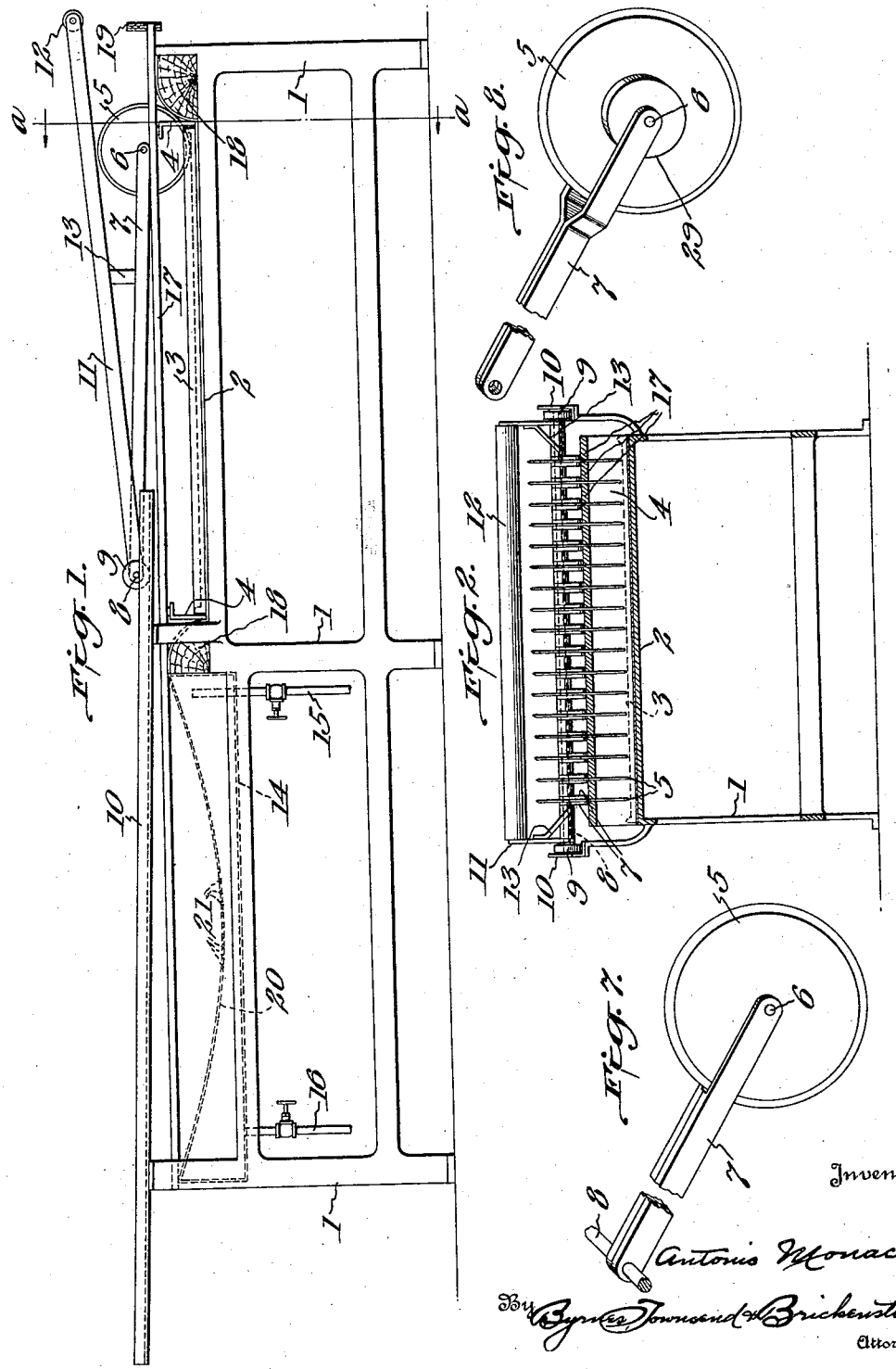
Inventor:
Antonio Monaco,
By Byrnes Townsend & Brickenstein,
Attorneys.

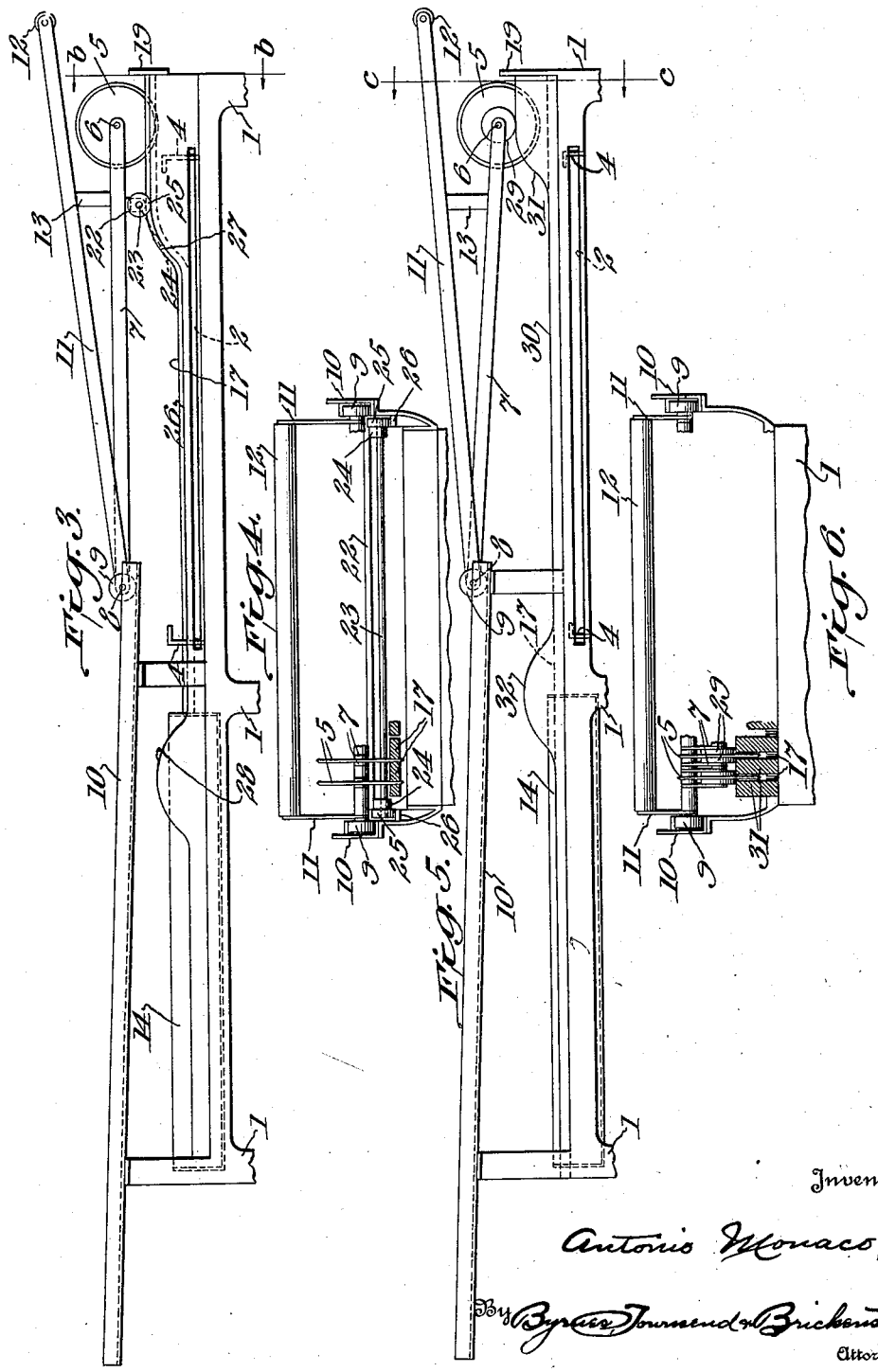

Patented May 22, 1928.

1,670,688

UNITED STATES PATENT OFFICE.

ANTONIO MONACO, OF ELMHURST, NEW YORK.

CUTTING MACHINE.

Application filed December 14, 1925. Serial No. 75,436.

This invention relates to cutting machines, and particularly to a machine for use in cutting pastry, although it may be used in connection with other food products. Such machines have hitherto presented certain disadvantages, one of the most serious of which is the gumming or sticking of the edges of the knives. This may be particularly the case when certain kinds of filled pastries or cakes, such as those having a core of fruit or jam, are to be cut. When the edges of the knives become dirty a sharp and complete cut frequently becomes impossible and it may be necessary to pass the knives a second time through the same cut, thereby causing crumbling and waste of the pastry. In this way, an entire pan of pastry may sometimes be ruined, since the resulting product may be unfit for sale.

I have overcome these difficulties by providing means for washing or cleansing the knives of the cutting machine as often as may be necessary. Moreover, according to my invention this washing may be performed without substantial loss of time, and without dulling or injury of the knives.

According to my preferred practice, the pastry is baked in the form of bars which are placed side by side in a cake pan. These bars are cut into cakes of the proper length by the simultaneous transverse motion of an assembly of aligned, spaced knives, each pastry bar being thus divided into a number of cakes one greater than the number of knives. The pastry bars are successively traversed by the knives until the entire cake pan is divided into cakes. A new pan full of pastry bars is then substituted for the old one, and the knives moved back again, cutting the new pan. As frequently as may be necessary the knives are passed through a washing trough, between cuts, whereby gumming or sticking is prevented.

Certain specific embodiments of my invention are shown in the accompaying drawings in which Fig. 1 is in part a vertical longitudinal section and in part an elevation of a machine embodying my invention; Fig. 2 is in part a tranverse section along the line $aa$ of Fig. 1; Fig. 3 is a partial vertical longitudinal section of another embodiment of my invention; Fig. 4 is a partial transverse section along the line $bb$ of Fig. 3; Fig. 5 is a partial vertical longitudinal section of still another embodiment; Fig. 6 is a partial transverse section along the line $cc$ of Fig. 5; and Figs. 7 and 8 are details of different types of knife holders used in connection with these machines.

In these drawings (1) represents a frame of any suitable construction upon which is carried a cutting table or support (2) for the reception of a cake or pastry pan (3) which may be properly positioned by means of pan guides (4) which are so arranged as to allow the free passage of the knives. In the pan (3) the pastry bars are arranged to lie transversely of the machine, as explained above. Circular knives (5) are mounted upon shafts (6), and individually supported by means of knife-holders (7), shown in Figs. 7 and 8, from a common shaft (8). This shaft (8) is supported at its extremities by rollers (9) running upon rails or tracks (10). The shaft (8) is connected by means of side members (11) to the operator's handle (12), and a spacing element (13) may be attached to the side members (11) in such a way as to support them and the operator's handle (12) above the knives (5). This spacing element (13) may be a solid piece, or may be composed of two depending members attached one to each side member, (11), with a transverse member uniting their lower ends, or may be otherwise suitably arranged. Its function is to support the side members (11) above the knives (5). To this end it is attached to the members (11), but merely rests upon the knife holders (7), or the higher of them. The individual knife holders (7) are therefore free to drop below this spacing element (13), since they are separately supported from the shaft (8). In this way the individual knives follow the irregularities of the bottom of the pan, while all the knives may be simultaneously moved transversely across the pan (3) by means of the handle (12). Each circular knife rotates separately upon its supporting shaft (6) by virture of its contact with the bottom of the pan, while the entire knife assembly moves transversely across the pan as the rollers (8) traverse the rails 10

Carried by the supporting frame-work (1) and situated adjacent the cutting table is a trough or washing tank (14). This tank may be filled with fresh water at intervals, or a stream of clean water may be kept continuously flowing through the tank by suitable inlet and outlet pipes, as at 15 and 16. Running longitudinally for the entire length of the machine are a series of knife guides 17, which serve to properly position the circular knives in traversing both the cake pan and the washing trough.

I may use various means for lifting the knives from the cake pan, and for transferring them to the washing trough. In the arrangement shown in Figs. 1 and 2 the knives are lifted from the cake pan, at either end, by means of cam-shaped knife-raising members (18), which may suitably be made from curved billets of wood covered with sheet metal. At the end near the operator a stop (19) is provided so that when the knives are lifted from the pan they may safely rest upon the knife-raising member (18) while a new pan is being inserted. At the end away from the operator the cam-shaped knife-raising member adjoins a false bottom 20, prefereably continuously curved, placed in the washing trough 14. On passing over the knife-raising member (18) the knives ride through the trough (14) on this false bottom, rotating by virtue of their contact therewith, and are thus thoroughly cleansed. The false bottom (20) may be perforated as at (21), to allow free passage of fresh water as well as the escape of washed off particles of pastry.

The continued passage of the knives over the knife-raising members (18) and along the false bottom (20) may produce unnecessary dulling, and to avoid this I employ the arrangement shown in Figs. 3 and 4. A transverse member 22 is supported from the knife assembly, as for instance from the two outside knife holders, and from this member (22) a transverse shaft (23) is supported by depending members (24). This shaft (23) carries rollers (25) which run on tracks or rails (26) beneath which the pan (3) is inserted. These rails (26) are provided with raised portions (27), at the end near the operator, on which the rollers (25) will ride in such a way as to lift the knives from the pan. The lower portions of the rails (26) are so positioned that the knives (5) will ride upon the bottom of the pan, while the transverse member (22), which may be fastened only to the outside knife holders, does not materially interfere with the individual play of the inner knives, which are still free to follow the irregularities of the pan. A second raised portion (28), of the rails (26), is so positioned as to lift the knives from the pan into the washing trough, the rails (26) again descending upon the far side of the raised portion (28), in order to allow the knives to dip into the water. By this means undue dulling of the knives may be prevented.

Another arrangement is shown in Figs. 5 and 6. The circular knives are here mounted in knife-holders of the type shown in Fig. 8. I provide each knife with two collars (29), attached one on each side thereof, and revolving with the knife about the shaft (6) as shown in Fig. 8. Between each pair of knives and on the outside of the outer knives I position rails (30) upon which ride the circular collars (29). These rails (30) are provided with raised portions (31) and (32) situated respectively at the end near the operator and between the pan and washing trough. The low portions of rails 30 between these two raised portions are so positioned that the knives rest individually, upon the bottom of the cake pan; while the portions of rails (30) situated over the washing trough are sufficiently low so that the knives dip into the water. The knives are rotated by virtue of the contact between collars (29) and rails (30), so that in traversing the washing trough they are thoroughly cleansed. By this arrangement there is no interference with the individual suspension of the knives which are accordingly free to follow the irregularities of the bottom of the cake pan. Dulling of the knives by the knife-raising members and false bottom of the water tank, of Figs. 1 and 2, is also avoided.

The preferred mode of operation of my invention will be clear from inspection of the drawings. The pastry is placed in pans for baking, in the form of the bars above referred to. The pastry pans are then inserted in the cutting machine as described, with the pastry bars arranged transversely to the direction of motion of the knives. The knife assembly is then caused to traverse the pan, the pastry bars being cut into cakes. The knives are then lifted from the pan by means of the knife-raising mechanism described. The pan of cut pastry is removed and an uncut one substituted. The knives are then passed in the reverse direction through this pan. Each pan is subjected to only a single passage of the knives. At every second passage the knives reach the end of the machine at which is located the washing trough. They may be washed if necessary. Several cuts may usually be made, however, between washings.

It will be obvious that considerable variations both in the structure of the cutting machine and its mode of operation may be made without departing from the spirit of my invention. For example, the pastry might be baked in one solid piece, filling the pan. This might be cut into cakes by turning the pan through an angle of 90° between cuts. Again, various forms of power may be substituted for the manual operation of the knife assembly. These and other variations are within the scope of my invention.

I claim:

1. The combination, in a cutting machine, of a cutting table, a knife assembly, a washing trough, and means including a plurality of rails for conveying the knives between said cutting table and said washing trough.

2. The combination, in a cutting machine, of a cutting table, a knife assembly, a washing trough, and means for conveying the knives between said cutting table and said trough, said means comprising a plurality of rails and means associated with said knives for causing them to follow the contour of said rails, said rails being so shaped that said knives descend freely upon said cutting table and into said washing trough but are lifted over the region between said table and said trough.

3. The combination, in a cutting machine, of a cutting table, a knife assembly including a plurality of separate knife holders, a knife carried by each of said holders, a shaft for supporting each of said knife holders individually, means associated with said shaft for controlling the transverse motion of said knife assembly, a plurality of rails associated with said cutting table, a second shaft associated with said knife assembly, and means carried by said second shaft and adapted to move upon said rails, whereby said knife assembly is caused to follow the contour of said rails.

4. The combination in a cutting machine of a cutting table, a knife assembly, a washing trough, and means including a plurality of rails provided with raised and depressed portions for conveying said knives between sad cutting table and washing trough, said rails being so shaped and positioned that said knives descend freely upon said cutting table and into said washing trough but are lifted over the region between said table and said trough.

In testimony whereof, I affix my signature.

ANTONIO MONACO.